United States Patent

[11] 3,597,839

[72] Inventor Ralph J. Jaccodine
Allentown, Pa.

[21] Appl. No. 805,668
[22] Filed Mar. 10, 1969
[45] Patented Aug. 10, 1971
[73] Assignee Bell Telephone Laboratories, Incorporated
Murray Hill, N.J.

[54] CIRCUIT INTERCONNECTION METHOD FOR MICROELECTRONIC CIRCUITRY
2 Claims, 2 Drawing Figs.

[52] U.S. Cl. .......... 29/626, 29/414 R, 29/412 R, 29/577 R, 29/583 R, 174/68.5 R, 317/101 A, 317/101 C, 317/101 CE, 339/17 C, 339/17 CF, 29/629 R
[51] Int. Cl. .......... H05k 3/30
[50] Field of Search .......... 29/411-—418, 583, 576 S, 624—630; 113/119; 339/17; 174/68.5; 317/101 A, 101 C, 101 CE

[56] References Cited

UNITED STATES PATENTS

| | | | |
|---|---|---|---|
| 2,882,519 | 4/1959 | Walentine et al. | 29/604 C X |
| 3,046,176 | 7/1962 | Bosenberg | 29/412 X |
| 3,077,021 | 2/1963 | Browentow | 29/604 X |
| 3,124,868 | 3/1964 | Zacaroli | 29/412 X |
| 3,271,625 | 9/1966 | Caraciolo | 29/576 S |
| 3,369,292 | 2/1968 | Manders | 29/414 X |

*Primary Examiner*—John F. Campbell
*Assistant Examiner*—Robert W. Church
*Attorneys*—R. J. Guenther and Edwin B. Cave

ABSTRACT: A crossover interconnection element for integrated or other microelectronic circuits comprises an arch member of dielectric material, typically ceramic or oxidized silicon, having an array of substantially parallel conductive strips on the underside of the arch and projecting transversely therefrom as self-supporting members. The eight of the arched member and the thickness of the conductive strips are such as to provide clearance, and therefore electrical isolation, between the strips and a conductive pattern on an integrated circuit so that the arched member can be placed on the circuit with the conductive strips transversely disposed and bridging the conductors on the integrated circuit and the projecting terminal portions of the strips are then bonded to conductive members on the circuit board.

INVENTOR
R. J. JACCODINE
BY H. W. Lockhart
ATTORNEY

CIRCUIT INTERCONNECTION METHOD FOR MICROELECTRONIC CIRCUITRY

This invention relates to microelectronic circuits including semiconductor integrated circuits and relates particularly to arrangements for insulated crossovers of conductive circuitry.

BACKGROUND OF INVENTION

Many integrated circuits require some means enabling one or more conductive leads of the circuit to cross other conductive members without being electrically connected. Typically, this problem of integrated circuit crossovers has been met by providing dielectric coatings on one layer of a conductive pattern and applying the crossing conductive members on top of the dielectric coating. Typically, silicon oxide has been used for such a separating film. Another technique for providing crossovers of conductive members is by means of crossunders in which channels of conductivity type material underlying and suitably insulated from surface conductive patterns are utilized as conductive channels. Both of the foregoing general arrangements entail certain shortcomings. In particular, dielectric films used as insulating separators are subject to imperfections not only during fabrication but they may also degrade in quality during use. In effect, they may break down and enable unwanted current leakage between conductors. Moreover, this arrangement occasions some complications of masking and deposition.

The crossunder arrangement, while satisfactory for some applications, tends to complicate the fabrication process inasmuch as oxide-masked diffusions of significant impurities are required to form the crossunder zones and also because of the use of valuable semiconductor material for the crossunder function. In addition, crossunders require isolation zones and may occasion certain parasitic effects in the electrical characteristics of the device.

Accordingly, an object of this invention is a crossover arrangement which avoids certain of the problems of the above-described arrangements and is compatible with current semiconductor device technology.

SUMMARY OF INVENTION

In accordance with this invention a crossover for a circuit pattern is provided by the use of an arch member of dielectric material having an array of conductive strips formed on the underside of the arch with self-supporting terminal portions projecting transversely from each side of the arch member. The arch member is of sufficient height, more than the thickness of the conductive strips on the underside thereof, so that when placed upon the surface of a conductive pattern the conductive strips are separated from the conductive pattern by an ample air space. The projecting terminal portions of the conductive strips then may be attached, typically by a mechanical bonding operation, to portions of the conductive pattern on the integrated circuit.

In particular, the crossover structure in accordance with this invention may be fabricated using standard semiconductor device technology, particularly as related to beam lead structures such as are disclosed in U.S. Pat. Nos. 3,287,612, 3,335,338 and 3,426,252 to M. P. Lepselter, which describe the beam lead technology. Advantageously oxidized silicon is used as the dielectric member and is formed in the shape of an arch by means of standard shaping techniques. The conductive strips, with self-supporting terminal portions, may be formed by masked metal depositions and selective etching techniques to separate the individual crossover elements. Once the individual crossover elements are formed they are readily placed on the integrated circuit patterns in the desired locations and bonded using well-known bonding techniques such as thermocompression bonding. Thus, a structure is formed in which the electrical isolation is assured even on a long term basis on a variety of applications without the necessity of devoting valuable semiconductor material volume to making such crossovers.

DETAILED DESCRIPTION

Figure 1:
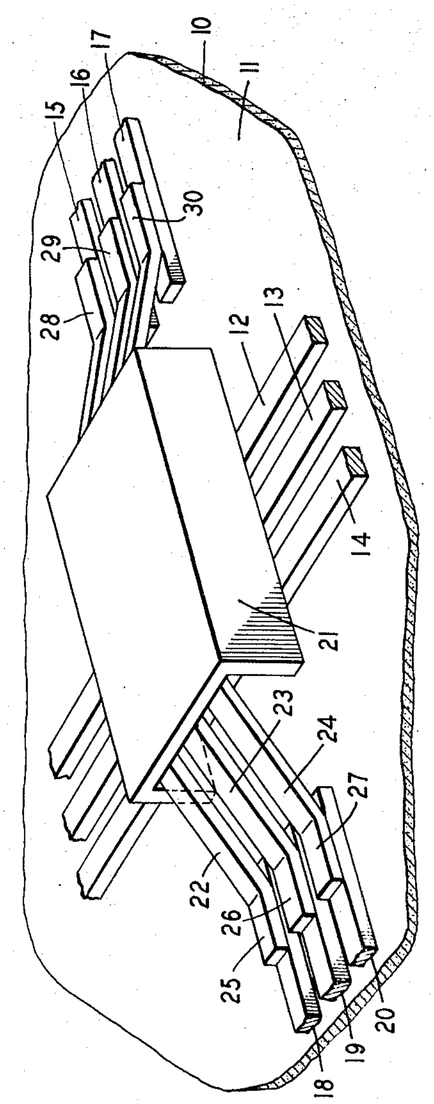
Figure 2:
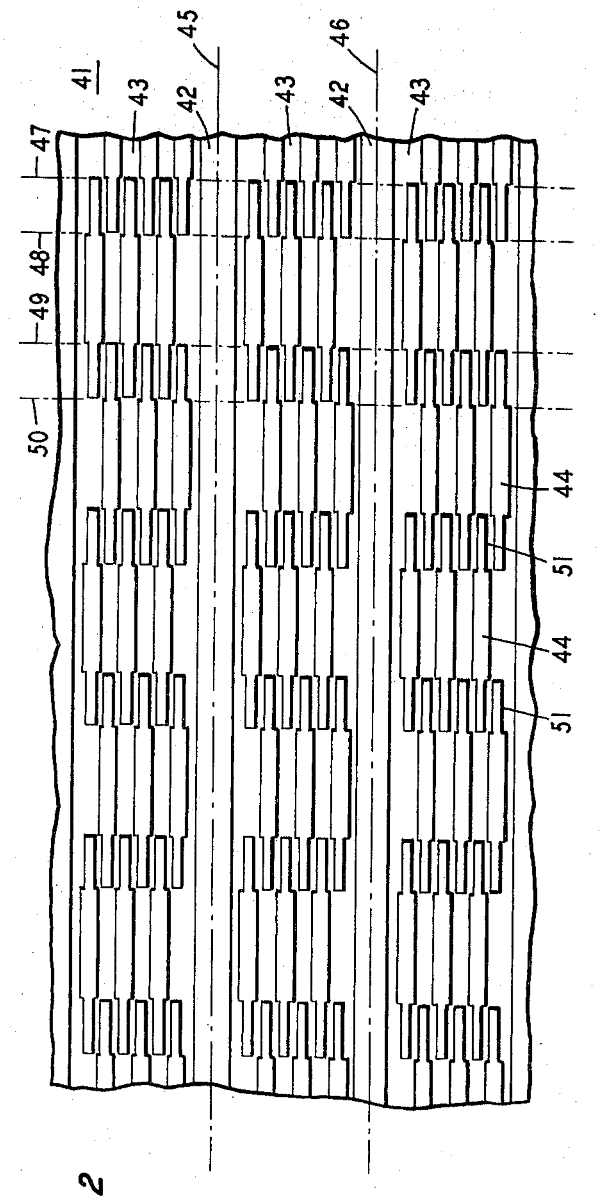

The invention and its other objects and features will be more clearly understood from the following detailed description taken in conjunction with the drawing in which:

FIG. 1 is an isometric view, greatly enlarged and somewhat idealized for clarity of explanation, of a crossover element in accordance with this invention mounted on a portion of a conductive pattern; and FIG. 2 is a plan view of a portion of a semiconductor slice at a stage in the formation of an array of crossover elements in accordance with this invention just prior to separation into individual crossover elements.

Referring to FIG. 1, a crossover element in accordance with this invention comprises an arched member 21 of dielectric material having an array of metal conductive strips 22, 23 and 24 affixed to the underside of the arch. The arch member 21 is transversely disposed on the surface of conductive members 12, 13 and 14 which may be parts of an integrated circuit pattern on the surface 11 of an integrated circuit. Similarly, conductive members 15, 16 and 17 and 18, 19 and 20 are portions of a conductive pattern of the integrated circuit and are interconnected by means of the crossover element shown without being electrically connected to the members 12, 13 and 14. Thus, the conductive strip members 22, 23 and 24 carried by the arch member 21 are bonded to the transversely disposed conductive circuit members as shown in the areas 25, 26, 27, 28, 29 and 30. The irregular outline denoted 10 represents the boundary of a plane surface portion of the integrated circuit. It will be understood that the dimensions, particularly the height of the underside of the arch member 21 as well as certain lateral clearances on the integrated circuit pattern, are exaggerated for clarity of explanation. Moreover, the dielectric arch member 21 may be of somewhat different proportions in shape requiring only the sufficient clearance on the underside thereof to insure separation between the conductive strips 22, 23, 24 and the conductive circuit pattern members 12, 13 and 14.

The crossover member as illustrated in FIG. 1 may be fabricated readily using techniques already a part of standard semiconductor device fabrication. Referring to FIG. 2 the slice portion 41 may comprise a part of a larger, generally circular slice of semiconductor material. The electronic quality of this material, typically silicon, is unimportant for this application and may be of single or polycrystalline structure and of any particular conductivity characteristic. Using the standard photoresist and oxide masking techniques, an array of parallel grooves and adjoining lands is formed typically by etching although other techniques including mechanical shaping processes may be employed. In FIG. 2 the portions 42 extending across the slice portion represent lands or raised areas while the areas 43 denote the bottom surface of channels across the slice portion 41.

After the channels 43 have been cut across the slice 41 a relatively thick coating of silicon oxide is formed over the entire slice conveniently by thermal oxidation which forms an excellent film from the standpoint of electrical isolation. Alternatively, if a material other than silicon is used, and if it is conductive or partially conductive, it likewise must be coated with a suitable dielectric film. However, if the material selected is an insulating ceramic obviously no further dielectric insulation is required. For example, the arch member may be fabricated from ceramics such as alumina.

Following the formation of an insulating coating, is such is required, an array of metal strips 44, which may be substantially parallel in disposition, are formed in the bottom of the channels 43 conveniently by means of the metal deposition processes disclosed in the above-noted M. P. Lepselter patents. Typically, such patterns of metallized strips are formed using photoresist masking techniques with various forms of vapor deposition or in certain cases plating techniques may be employed. In accordance with the Lepselter teachings a succession of compatible materials are deposited, including titanium, platinum and gold, to form conductive strips of suitable thickness, strength and electrical characteristics. This system is particularly convenient where semiconductor devices are being fabricated using the same metallization and metal removal arrangements.

Each of the conductive strips 44 has terminal beam lead portions 51 which will, after separation of the individual crossover elements, form the projecting beam leads for completing the crossover. As shown in FIG. 2 a geometry is provided to enable overlapping and interdigitation of strips to economize in the use of material. Following formation of the conductive strips 44 the slice is suitably masked for the separation etching process by which the slice is separated along the center of the lands 42 generally as shown by the broken lines 45 and 46. The slice is separated transversely by removal of the semiconductor material between broken lines 47 and 48 and between the broken lines 49 and 50. Thus, there is formed a plurality of individual crossover elements each comprising an arch member of oxidized silicon having three conductive strips formed on the underside of the arch with projecting portions 51 from each end of the arch, particularly if the titanium, platinum and gold metallization technique is utilized. The crossover member is readily bonded at the areas 25, 26, 27 etc. as shown in FIG. 1 and such bonding as well as placement of the crossover members on the circuits may be done utilizing automatic means including tooling jigs.

Thus, a crossover member has been disclosed which is conveniently fabricated utilizing standard semiconductor technology and which is assured of a long lifetime, suitable electrical characteristics and without using valuable semiconductor volume.

I claim:

1. The method of fabricating insulated crossover interconnecting elements and mounting same on the surface of a circuit-containing structure having unconnected circuits comprising forming in a slice of semiconductor material an array of channels thereby leaving land portions between said channels, forming on the bottom face of said channels a series of conductive strip patterns, each pattern comprising a plurality of parallel strips each having a thickened terminal portion, the terminal portions of each adjoining pattern being interdigitated, separating the slice into individual crossover elements by dividing the slice along said land portions, while leaving portions of each land area on each of said elements, removing slice material underlying the terminal portions of the conductive strips thereby leaving same freely extending, and interconnecting said extending terminal portions of certain of the elements with said circuits while abutting said land portions on portions of the said substrate.

2. The method in accordance with claim 1 in which the mounting of said individual crossover element includes pressure bonding the terminal portions of said element to circuit portions of said integrated circuit.